Patented July 1, 1947

2,423,398

UNITED STATES PATENT OFFICE 2,423,398

THERMOSTATIC DEVICE FOR CONTROLLING FOR COOLING PURPOSES, THE FLOW OF FLUIDS

William Frederick Forrest Martin-Hurst, Sunbury-on-Thames, England

Application March 29, 1943, Serial No. 481,029
In Great Britain March 2, 1942

4 Claims. (Cl. 236—34)

This invention relates to thermostats for use in controlling, for cooling purposes, the flow of fluids, and has particular, although not exclusive reference to the control of lubricating oil or cooling liquid in the cooling systems of aircraft engines and other internal combustion engines.

The object of the present invention is to provide an improved form of thermostat for the purpose above indicated designed to operate automatically in diverting the fluid flow to the cooler or to a by-pass arrangement according to the temperature of the fluid and which embodies a safety device constructed to ensure the passage of all the fluid through the cooler in the event of a break-down.

According to the present invention a thermostat for use in controlling, for cooling purposes, the flow of fluids is provided comprising a sleeve valve movable in a housing to connect an inlet port with an outlet to a cooler or an outlet to a by-pass, the movement of the said sleeve being effected by means of an expansible thermostatic element which is exposed at all times to the flow of fluid through the said housing.

The invention also consists in a thermostat for use in controlling, for cooling purposes, the flow of fluids comprising a ported sleeve valve movable axially in a housing, an expansible thermostatic element mounted within said sleeve valve and adapted to cause movement thereof, an inlet port in said housing in permanent communication with the interior of said sleeve and outlet ports in said housing communicating respectively with a cooler and a by-pass passage, the ports in said sleeve valve enabling either or both of said outlets to be placed in communication with said inlet port.

Reference will now be made to the accompanying drawings which illustrate a thermostatic control valve constructed according to the invention and in which—

Figure 1:
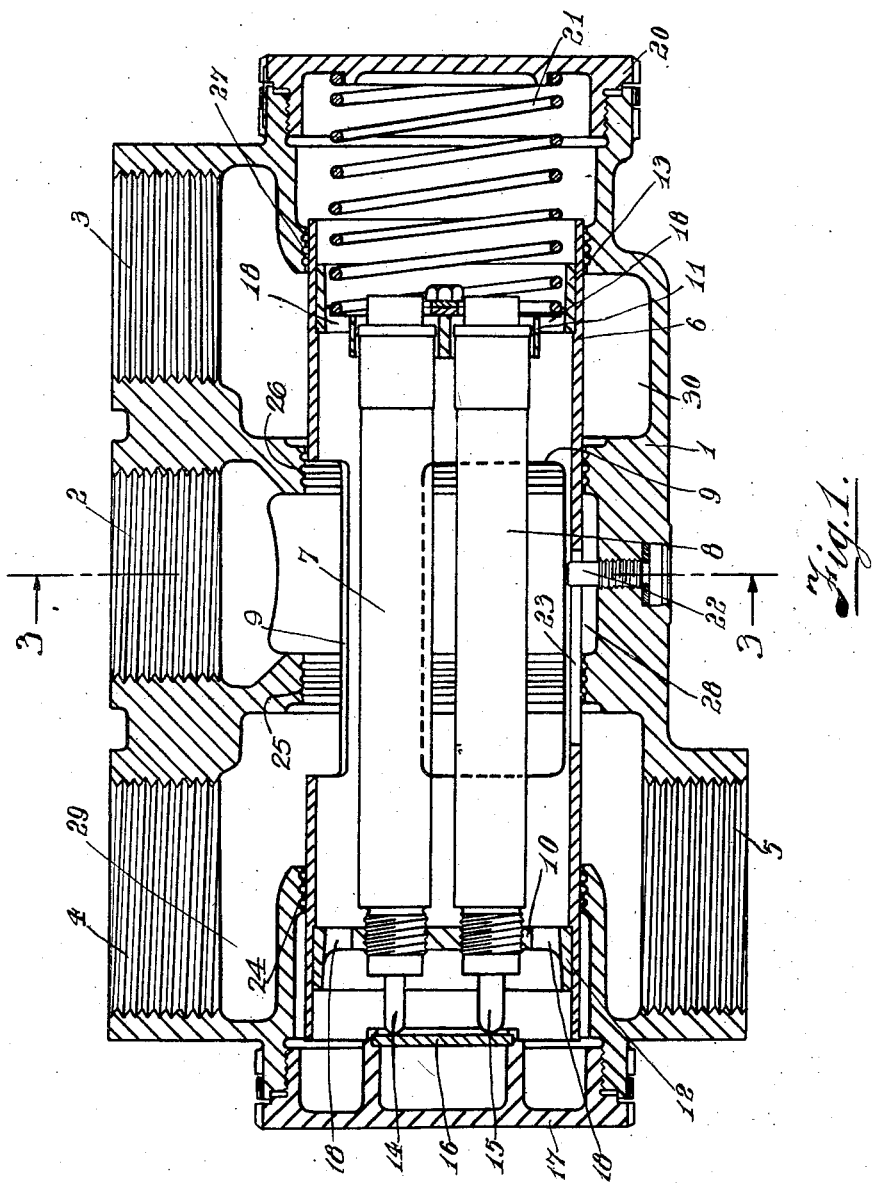
Figure 2:
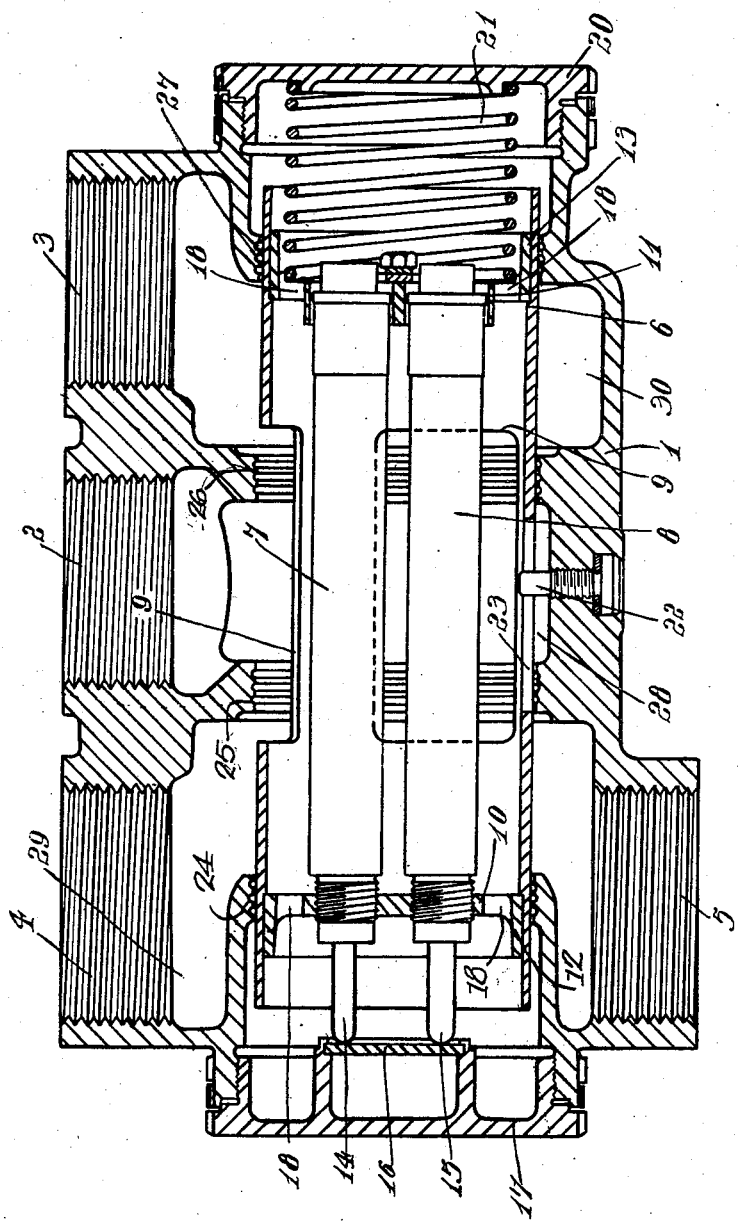
Figure 3:
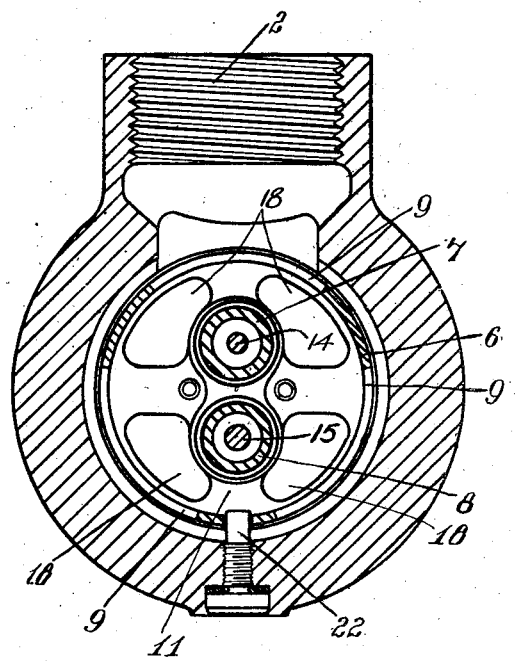

Fig. 1 is a longitudinal sectional elevation showing the valve in one extreme position, Fig. 2 is a sectional elevation similar to Fig. 1 but showing the valve in an intermediate position, and Fig. 3 is a cross section taken on the line 3—3 of Fig. 1.

In the construction illustrated, which is intended for application to the oil cooling system of an aircraft engine, the thermostatic control device enclosed within the casing 1 is adapted to be interposed between a pump arranged to withdraw oil from the engine sump and a radiator, a by-pass passage being provided so that, under conditions to be described later, the oil can be circulated direct back to the oil feed tank and to the engine without passing through the radiator.

The housing 1 has an oil inlet at 2, an outlet 3 to the cooler or radiator and outlets 4 and 5 through which oil can be diverted to the by-pass passage. The flow of oil entering through the inlet 2 is controlled by an axially movable ported sleeve 6 constituting the valve member, whose position is determined by a thermostatic device 7 or 8 disposed within the sleeve 6 and in positions wherein they can expand in directions axially of the sleeve.

The thermostatic devices 7 and 8 are preferably of the kind which relies for its operation on the expansion under heat of a substance such as wax or grease.

The sleeve 6 has three ports 9 formed in it which are of equal size and are disposed in positions 120° apart as will be seen from the sectional view (see Fig. 3). The ends of the sleeve 6 are provided with thermostat supports 10 and 11 formed with peripheral flanges 12 and 13 by means of which the supports are fixed in position. The thermostats 7 and 8 are fixedly mounted in the support 10 by screw threading their ends into screw threaded apertures in the support. The ends 14 and 15 of the thermostat plungers project beyond the support 10 and bear against a plate 16 fixed in a detachable member 17 which closes one end of the valve housing 1. The opposite ends of the thermostats are housed within the second support 11. The adjacent end of the valve housing is closed by a detachable closure element 20 between which and the support 11 is disposed a coiled spring 21 which is thus compressed by any tendency of the sleeve 6 to move towards the right, Fig. 1, and operates as a return spring. As shown in Fig. 3 the supports 10 and 11 are formed with perforations 18 whereby the oil has free access to the ends of the housing 1 in both directions. Thus trapping of air in the ends of the housing which would interfere with the correct operation of the apparatus is prevented.

Rotary movement of the sleeve 6 is prevented by a stud 22 which projects into a slot 23 in the sleeve which slot is of sufficient length to permit the necessary axial movement in either direction. The imperforate end portions of the sleeve 6 are adapted to co-operate with annular shoulders 24, 25, 26 and 27 formed internally of the valve housing 1.

The inlet 2 communicates with an annular chamber 28 formed between the shoulders 25 and 26 so that under all conditions the oil can enter through the ports 9 in the sleeve and flow around the control thermostats 7 and 8. The thermostat 7 responds to normal temperature fluctuations but the second thermostat 8 although constructed and mounted in a manner similar to the thermostat 7, is arranged so that it will only respond to a relatively high temperature and will not be affected whilst the control device is operating normally. Should, however, the thermostat 7 break down for any reason and cease to be operative, the tendency of the spring 21 to close the outlet to the cooler would divert all, or most of, the oil through the by-pass outlets 4 and 5 but should this oil become heated thereby to a temperature likely to prove a source of danger, then the second thermostat 8 becomes operative to move the sleeve 6 into a position wherein all the oil is diverted through the outlet 3 to the cooler or radiator.

In the position shown in Fig. 1, the right hand end of the sleeve 6 by engaging the shoulder 26 cuts off communication between the oil inlet 2 and the outlet 3 to the cooler but the oil can flow freely through those portions of the ports 9 which extend into the annular chamber 29 from which it can escape through the outlets 4 and 5 leading to the by-pass passage. As the oil becomes heated and the contents of the thermostat 7 expand and as the piston and its rod 14 cannot move, the outer casing will be forced towards the right taking with it the sleeve 6 which moves against the action of spring 21 until a position is reached shown in Fig. 2 wherein some of the oil can begin to pass the annular shoulder 26 into the chamber 30 and thence through the outlet 3 to the cooler or radiator.

Owing to the intermediate position of the sleeve valve some of the oil can continue to escape through the by-pass outlets 4 and 5 but should the temperature of the oil rise still further the sleeve valve will move to a position wherein the annular chamber 29 is cut off completely from the annular chamber 28 so that all of the oil entering through inlet 2 is diverted through the outlet 3 to the cooler or radiator. As the temperature of the oil falls, the thermostatic device 7 will contract and the spring 21 which has been compressed during the movement to open the cooler port 3, will expand and tend to return the sleeve 6 to the position shown in Fig. 1.

The shape of the ports 9 in the valve member 6 can be varied to suit particular conditions. For example, in cases where a high resistance is liable to exist to flow through a radiator, the tendency of the oil to flow more readily through the by-pass can be checked by forming one end of each port 9 of reduced area, for example by tapering. In this manner, movement of the sleeve valve will restrict flow through the by-pass and tend to build up sufficient pressure to force oil through the cooler.

I claim:

1. A thermostatic device for controlling the flow of cooling liquid in internal combustion engines, comprising a housing having axially spaced and aligned annular shoulders dividing the housing into an inlet chamber and a pair of outlet chambers disposed at the respective sides of the inlet chamber and having means for connecting them to a cooler and to a by-pass respectively, a hollow sleeve valve extending through and fitted to slide axially of said shoulders and having a port in a side thereof of an axial length greater than the axial spacing of said shoulders to remain in communication with the inlet chamber throughout the range of movement of the sleeve valve and to extend into one or the other of said outlet chambers when the sleeve valve is moved toward one or the other end of its range of movement, an expansible thermostat mounted within the axis of the sleeve valve and operative when expanded to move the sleeve valve toward a position wherein said port in the sleeve valve extends from the inlet chamber into the cooler outlet chamber, and a spring acting on the sleeve valve to move the latter toward a position wherein said port in the sleeve valve extends from the inlet chamber into the by-pass outlet chamber.

2. A thermostatic device for controlling the flow of cooling liquid in internal combustion engines, comprising a housing having a pair of annular axially spaced and aligned shoulders dividing the housing into a pair of outlet chambers having means for connecting them to a cooler and to a by-pass respectively, and an inlet chamber aligned with and disposed between the outlet chambers, a hollow cylindrical sleeve valve fitted to slide axially through said shoulders and extending through the inlet chamber and into the outlet chambers, and having circumferentially spaced ports in the sides thereof for the flow of liquid transversely through the interior of the sleeve valve, said ports having an axial length greater than the axial spacing of said shoulders to remain partly at least within the inlet chamber throughout the range of movement of the sleeve valve and to extend into one or the other of the outlet chambers when the sleeve valve is moved toward one or the other end of its range of movement, an expansible thermostat mounted within and extending longitudinally of the axis of the sleeve valve and exposed to liquid flowing transversely therethrough, said thermostat being operative when expanded to move the sleeve valve toward a position wherein said ports in the sleeve valve extend from the inlet chamber into the cooler outlet chamber, and a spring acting on the sleeve valve to move the latter toward a position wherein said ports in the sleeve valve extend from the inlet chamber into the by-pass outlet chamber.

3. A thermostatic device for controlling the flow of cooling liquid in internal combustion engines, comprising a housing having spaced and aligned shoulders therein dividing it into an inlet chamber and outlet chambers disposed at opposite sides of the inlet chamber and having means for connecting them to a cooler and to a by-pass respectively, a hollow sleeve valve extending through the inlet chamber into the outlet chambers and slidable longitudinally through said shoulders, said sleeve valve having ports in the sides thereof for the flow of liquid through the sleeve valve and being of a length greater than the spacing of said shoulders, and a pair of thermostats mounted within the sleeve valve and exposed to the flow of liquid therein, one of said thermostats being responsive to the normal operating temperature of the liquid to move the sleeve valve in a direction to establish communication between the inlet chamber and the cooler outlet chamber, and the other of said thermostats being operative in response to a temperature of the liquid higher than normal to move the sleeve valve in said direction in the event of failure of said thermostat responsive to the normal operating temperature of the liquid.

4. A thermostatic device for controlling the flow of cooling liquid in internal combustion engines, comprising a housing having spaced and aligned shoulders therein dividing the housing into an inlet chamber and outlet chambers disposed at opposite sides thereof and having means for connecting them to a cooler and to a by-pass respectively, a hollow sleeve valve slidable longitudinally through said shoulders and extending through the inlet chamber into the outlet chambers, said sleeve valve having a port in a side thereof and communicating with its interior, said port being of a length greater than the spacing of said shoulders, and a pair of thermostats mounted within and extending longitudinally of said sleeve valve, one element of each thermostat being connected to the sleeve valve and the other element of each thermostat being positioned to abut against a fixed wall of the housing, one of said thermostats being operative in response to normal operating temperature of the liquid to move the sleeve valve in a direction to establish communication between the inlet chamber and the cooler outlet chamber through said port in the sleeve valve, and the other thermostat being non-operative to move the sleeve valve at said normal operating temperature of the liquid but operative in response to an abnormally high temperature of the liquid to move the sleeve valve in said direction, and a spring acting to hold said other element of the thermostat responsive to normal operating temperature against said wall of the housing.

WILLIAM FREDERICK
FORREST MARTIN-HURST.

REFERENCES CITED

The following references are of record in the file of this patent:

UNITED STATES PATENTS

| Number | Name | Date |
|---|---|---|
| 1,000,435 | Pagelsen | Aug. 15, 1911 |
| 1,434,542 | Horne | Nov. 7, 1922 |
| 1,611,650 | Lawler | Dec. 21, 1926 |
| 1,635,083 | Hermesmeyer | July 5, 1927 |
| 2,136,235 | Crago | Nov. 8, 1938 |
| 2,374,593 | Ernst | Apr. 24, 1945 |

FOREIGN PATENTS

| Number | Country | Date |
|---|---|---|
| 209,415 | Switzerland | July 1, 1940 |
| 662,977 | Germany | July 26, 1938 |
| 350,065 | Italy | July 5, 1937 |
| 371,173 | Italy | May 13, 1939 |
| 547,350 | Great Britain | Aug. 24, 1942 |

OTHER REFERENCES

Sarco, Catalog Sheet No. 140, A. I. A. file 29-D21, published June, 1936, by the Sarco Co., 188 Madison Ave., New York.